United States Patent [19]

Boryta

[11] 4,261,960

[45] Apr. 14, 1981

[54] REMOVAL OF BORON FROM LITHIUM CHLORIDE BRINE

[75] Inventor: Daniel A. Boryta, Downingtown, Pa.

[73] Assignee: Foote Mineral Company, Exton, Pa.

[21] Appl. No.: 28,975

[22] Filed: Apr. 11, 1979

[51] Int. Cl.³ .............................................. C01D 15/04
[52] U.S. Cl. .................................. 423/179.5; 23/298; 159/1 S; 423/158; 423/164; 423/166
[58] Field of Search ..................... 423/158, 179.5, 166, 423/164, 189, 190; 23/298

[56] References Cited

U.S. PATENT DOCUMENTS

| | | | |
|---|---|---|---|
| 3,268,289 | 8/1966 | Macey | 423/179.5 |
| 3,342,548 | 9/1967 | Macey | 423/199 |

OTHER PUBLICATIONS

Chemical and Engineering News, vol. 44 (1966), pp. 38 and 39 (Reprint).
Chemical Engineering, Aug. 15, 1966, pp. 86–88 (Reprint).

*Primary Examiner*—O. R. Vertiz
*Assistant Examiner*—Wayne A. Langel
*Attorney, Agent, or Firm*—Howson & Howson

[57] ABSTRACT

Boron, as well as magnesium and sulfate impurities, are removed from or at least substantially reduced in a lithium containing brine to minimize lithium losses on further concentration of the brine by adding to the brine an aqueous slurry of slaked lime and a solution of calcium chloride to form a calcium borate hydrate, magnesium hydroxide and calcium sulfate dihydrate, the last named compound being precipitated and separated from the brine. On further concentration of the brine, calcium boron hydrate and magnesium hydroxide precipitate and they are also removed from the brine. In an alternate procedure, the pH of the brine is adjusted to 8.0–8.4 by addition of hydrochloric acid to form a calcium borate hydrate, which on further evaporation, is also separated from the brine. The brine is then concentrated further to recover lithium values.

6 Claims, No Drawings

REMOVAL OF BORON FROM LITHIUM CHLORIDE BRINE

BACKGROUND OF THE INVENTION

Lithium metal has many uses and, to name a few, they include nuclear power application where a blanket of the liquid metal or its molten salts is used for breeding purposes in nuclear fusion reactors, in lightweight, compact lithium/sulfur batteries for electric cars and for power plant load leveling purposes, as a degasifier in the production of high-conductivity copper and bronze, and in the synthesis of compounds for use in the field of medicine.

Lithium metal is generally produced by electrolysis of an eutectic mixture of highly pure molten lithium chloride and potassium chloride.

There are naturally occurring brines in the United States which contain reasonable concentrations of lithium, in the form of the chloride, so as to be considered viable reserves for lithium recovery. Three particular sources include Searle's Lake, California, the Great Salt Lake, Utah, and Clayton Valley, Nevada. The last is the most economical source of lithium since the magnesium to lithium ratio is low, generally about 1.15:1, which allows for a simplified process of concentrating, purifying and recovering lithium chloride brine. Lithium carbonate is then obtained by treatment of the brine with soda ash.

To make lithium metal, the lithium carbonate is converted to lithium hydroxide via a liming process, and the latter compound in turn is converted to lithium chloride by treatment with hydrochloric acid followed by drying. This is a very circuitous and expensive route to lithium chloride, since lithium originally exists as the chloride in the natural brine. Thus for many years there has been the need for a direct economical method for recovering lithium chloride as such from natural brines.

In lithium containing brines, the magnesium, calcium, sulfate and boron content have to be minimized in order to produce a lithium chloride product suitable for production of lithium metal by eletrolysis. Alkaline earth metals, such as magnesium and calcium, must be removed from the lithium chloride, otherwise they will be present as contaminants in the lithium metal. During electrolysis of lithium chloride, non-volatile anions, such as sulfate and borate, will build up, resulting in rapid short-circuiting of the cell.

The presence of boron also results in losses of lithium on concentration of the brine. More particularly, on concentration of a lithium containing brine, boron, if present in significant quantities, e.g. 0.2% or more, will precipitate lithium values as lithium tetraborate tetrahydrate ($Li_2B_4O_7.4H_2O$). Depending upon the boron concentration of the brine, such losses of lithium can be economically signficant.

Heretofore boron has been removed from, or the concentration thereof has been substantially reduced in lithium chloride brines by various methods including treatment of a brine with slaked lime to precipitate calcium borate and, in the case of brines containing substantial magnesium impurities, magnesium borate; by absorbing borates on clays, on $HCO_3^-$ and $Cl$ type resins, or on activated alumina in the presence of magnesium; by precipitating borate as a boro-phosphate concentrate by treating the brine with lime in combination with phosphoric acid; by acidification of the brine to precipitate boric acid, and by solvent-solvent extraction, i.e. with n-butanol.

It is a primary object of this invention to provide an economical process for removing or at least substantially reducing the amount of boron as well as magnesium and sulfate impurities in a lithium containing brine.

Another object of this invention is a novel process for treating a lithium containing brine to reduce losses of lithium in the form of compounds of boron on further concentration of the brine.

Still another object of this invention is to provide a lithium containing brine which may be further concentrated to produce lithium chloride suitable for use in the electrolytic production of lithium metal.

These and other objects of this invention will become apparent from a consideration of this specification and appended claims.

DETAILED DESCRIPTION OF THE INVENTION

This invention is predicated on the discovery that through proper chemical treatment, and according to a particular embodiment of the invention through proper pH control, the boron content of a lithium chloride brine can be drastically reduced whereby loss of lithium values through precipitation of lithium borate hydrate on further concentration of the brine can be avoided. Advantageously, concurrently with reduction in boron concentration, the amount of such impurities as magnesium and sulfate, which are usually present in naturally occurring brines, can be drastically reduced.

As noted above, when a lithium chloride brine containing boron is concentrated, as for example by means of solar energy, lithium tetraborate tetrahydrate ($Li_2B_4O_7.4H_2O$) precipitates from the brine with resultant losses of lithium values. According to the present invention, it was discovered that the boron content, as well as the magnesium and sulfate content of a lithium chloride brine, could be substantially reduced to prevent losses of lithium values as lithium borate hydrate on further concentration of the brine by treating the brine with a slurry of slaked lime and a solution of calcium chloride, followed if desired by adjustment of the pH of the brine to promote formation of a particular calcium borate hydrate which precipitates on further concentration of the brine.

In order to better understand the nature of and advantages to be gained by the practice of the process of this invention, such process is described in connection with brine produced by solar evaporation at Clayton Valley, Nevada, although it should be understood that the process applies to lithium chloride brine from any source.

Since 1965, Foote Mineral Company, Exton, Pa., has been producing lithium carbonate from a natural brine at Clayton Valley, Nevada. The brine there available contains on the order of 200 to 400 ppm of lithium, present as lithium chloride. The ratio of magnesium to lithium is only about 1.15:1, and of potassium to lithium about 15:1. For this reason, lithium can be extracted as the primary product and magnesium and potassium discarded, although the latter metal could be recovered as potash if economically viable.

At Clayton Valley, saline brine is pumped from one or more operating wells and delivered to a pond system which covers over 1000 acres.

During concentration by means of solar energy, the brine is first held in a 650-acre pond until the lithium concentration increases from the initial 0.025%. The brine is then transferred to a 150-acre pond. After the lithium concentration reaches 0.08%, the brine is transferred to several 50-acre ponds. En route, lime is added, and magnesium in the brine precipitates in an intermediate settling pond. This reduces the concentration of magnesium to 2 to 3 parts per million of brine.

Brine remains in the 50-acre ponds until the concentration of lithium chloride reaches 2%. It is then transferred to a series of 10-acre ponds. As solor evaporation increases the concentration of lithium chloride to 3%, potassium chloride and sodium chloride precipitate. The concentrated brine, called bittern, is then pumped to the lithium carbonate mill.

A representative composition of brine, obtained by solar evaporation and certain chemical treatment as described hereinabove is set forth in Table I.

TABLE I

| Constituent | Weight Percent | |
|---|---|---|
| Li | 0.615 | (3.76% LiCl) |
| Na | 6.73 | |
| K | 4.82 | |
| Mg | 0.0022 | |
| Ca | 0.0081 | |
| B | 0.21 | |
| $SO_4$ | 2.22 | |
| Cl | 16.37 | |
| Br | 0.05 | |
| $H_2O$ | 66.56 | |

Such brines typically have a pH of about 9.6 and a specific gravity of about 1.241 at 23° C.

In practicing the process of the invention a slurry of slaked lime is added to an impure lithium chloride brine, such as that having the composition given in Table I, above. The quantity of slaked lime added to the brine should be sufficient to react with magnesium present to form magnesium hydroxide. Upon further concentration of the brine, the magnesium content is reduced to not more than about 2 ppm by precipitation of the magnesium hydroxide. By determining the magnesium concentration of the impure brine, the amount of slaked lime to be added can be readily ascertained. Upon addition of the slaked lime, the pH of the brine increases to about 11 or slightly more.

An aqueous solution of calcium chloride, e.g. a solution containing about 5 to about 20 weight percent, preferably about 10 percent, calcium chloride, is then added to the bringe to precipitate sulfate as substantially insoluble calcium sulfate dihydrate (gypsum). Some of the calcium chloride reacts with boron present in the brine to form a calcium borate hydrate, namely $CaB_2O_4.6H_2O$. The total quantity of calcium chloride employed should be the stoichimetric amount required to react with all of the boron and sulfate present in the brine to form $CaB_2O_4.6H_2O$ and gypsum, respectively. Additional calcium chloride can be added to the bringe during subsequent evaporation of the brine as required by stoichiometry to remove any remaining traces of boron and sulfate.

Following addition of calcium chloride, the brine is subjected to a liquid-solids separation to remove the precipitated gypsum. Various well known methods, such as settling and decantation, filtration and centrifugation, may be employed to effect such liquid-solids separation.

Upon further concentration of the treated brine, as for example by solar evaporation, $CaB_2O_4.6H_2O$, additional gypsum, and magnesium hydroxide precipitate, whereby the brine is further purified. Precipitation of these impurities usually begins to take place when the lithium chloride concentration reaches about 3.6 percent (0.6% Li).

In accordance with an alternate embodiment of this invention, the pH of the brine after lime and calcium chloride addition and separatin of gypsum, is then reduced to a pH in the range of about 8.0 to about 8.4, preferably to about 8.2, by addition of the appropriate quantity of hydrochloric acid. It was discovered that a pH in the aforesaid range, a particular calcium borate hydrate, believed to have the formula $2CaO.3B_2O_3.13-H_2O$ is formed, which compound exhibits minimum solubility in the brine at such pH. Thus a major portion of the boron in the brine is precipitated and can be separated from the brine or can be separated later on further concentration of the brine.

As noted, an additional amount of calcium chloride may be added to the brine during further concentration of the brine to remove remaining traces of boron and sulfate. Regardless of whether the pH of the brine has been adjusted to about 8.0–8.4 or not, the total amount of calcium chloride used should be such as to react with the boron and sulfate. This step is necessary since there is a 10–15 fold concentration factor in the evaporation process in obtaining highly concentrated (40%+) lithium chloride brines. Analytical variability (±3%) mandates adjustment at higher concentrations for improved accuracy while minimizing lithium losses by reason of the presence of sulfate and boron impurities, while avoiding contamination of the final brine with excess calcium.

The additional material precipitated at pH 8.0–8.4 comprises essentially gypsum and calcium borate hydrate which is also separated from the brine by any suitable liquid-solids separation procedure.

The resulting purified brine may then be further concentrated, as for example by solar energy in accordance with the process of copending application Ser. No. 028,976, filed Apr. 11, 1979. The concentration can be carried out to the point where lithium chloride monohydrate precipitates, which product, although not sufficiently pure to be used as an electrolyte in the production of lithium metal, may be used for various other purposes.

Should a highly pure form of anhydrous lithium chloride be desired, the brine, after further concentration by solar energy or other means, may be subjected to evaporation, preferably under vacuum, at temperatures above about 101° C. The anhydrous lithium chloride thus obtained may then be further purified according to the process of copending application Ser. No. 028,974, filed Apr. 11, 1979, according to which the anhydrous lithium chloride is first heated to a temperature above about 200° C., followed by solvent extraction with isopropanol. The resulting product is highly pure lithium chloride suitable for the production of lithium metal.

The following examples are illustrative of the practice of the present invention.

EXAMPLE 1

A brine containing 0.77% lithium, in the form of lithium chloride, and 0.28% boron, as well as magnesium and sulfate impurities, was treated with a slurry of slaked lime to a pH of 11 to precipitate magnesium as magnesium hydroxide, and then treated with a sufficient amount of a 20% solution of calcium chloride to form calcium borate hydrate. At pH 11, only gypsum precipitated and the boron concentration of the brine, after separation of the precipitated material, was reduced to 0.15%B due to dilution effect.

The pH of the brine was then adjusted to pH 8 by addition of hydrochloric acid, and the brine was again filtered. By such procedure the boron concentration was further reduced to 0.082%.

EXAMPLE 2

A brine containing 0.77% lithium in the form of lithium chloride, and 0.27% boron, as well as magnesium and sulfate impurities, was treated with a slurry of slaked lime to precipitate magnesium as magnesium hydroxide and then treated with a 20% solution of calcium chloride to form gypsum and a calcium borate hydrate of the formula $CaB_2O_4.6H_2O$. The brine, after being filtered to separate the precipitated gypsum, had a boron concentration of 0.13% due to dilution effect. The pH of the filtered brine was then adjusted to 8.2 by addition of hydrochloric acid and the brine was again filtered. The filtrate contained only 0.09% boron.

The filtrate was further concentrated to increase the lithium concentration to 1.5%. The boron content of the more concentrated brine remained at 0.09%. Calcium chloride was added to adjust the mole ratio of calcium to boron plus sulfate $(B+SO_4)$ of the brine to 1.0, and the pH was again adjusted to 8.2.

The brine was further concentrated to 4.9% lithium, and the boron content of the still more concentrated brine was only 0.16%, as compared to 0.5% boron for a brine which had been similarly concentrated, but had not been subjected to calcium chloride treatment and pH control according to the present invention.

EXAMPLE 3

A brine containing 0.77% lithium in the form of lithium chloride, and 0.28% boron, as well as magnesium and sulfate impurities, was treated with a slurry of slaked lime to a pH of 11.2 to precipitate magnesium as magnesium hydroxide and then treated with a sufficient amount of a 20% solution of calcium chloride to form calcium tetra borate $(CaB_2O_4.6H_2O)$, and gypsum. At pH 11.2, only gypsum precipitated and boron was reduced to 0.15%B due to a dilution effect. Upon concentrating the brine by evaporation, to 40% Li, calcium tetraborate hydrate precipitated and the boron was maintained at 0.13%B.

By means of the present invention, a reduction on the order of 70% in the boron content of a brine which initially contains on the order of 0.25–0.30% boron can be effected. Furthermore, the boron content can be maintained below about 0.17% even though the brine is concentrated so as to contain in excess of 40% lithium chloride.

It is claimed:

1. A process for decreasing the quantity of boron, as well as magnesium and sulfate impurities in a lithium chloride brine to minimize lithium losses on further concentration of the brine which comprises adding to the brine an aqueous slurry of slaked lime and an aqueous solution of calcium chloride, the amount of lime and calcium chloride being sufficient to react with substantially all of the magnesium, boron and sulfate present in the brine to form magnesium hydroxide, a calcium borate hydrate and calcium sulfate dihydrate, respectively, separating precipitated calcium sulfate dihydrate from said brine, and further concentrating said brine to precipitate magnesium hydroxide and said calcium borate hydrate.

2. The process according to claim 1 in which said brine, prior to said treatment, contains at least about 3 percent, by weight of lithium chloride and not more than about 2 ppm magnesium.

3. The process according to claim 1 in which said calcium chloride is added as an aqueous solution containing from about 5 to about 20 percent, by weight, of calcium chloride.

4. A process for decreasing the quantity of boron, as well as magnesium and sulfate impurities in a lithium chloride brine to minimize lithium losses on further concentration of the brine which comprises adding to the brine an aqueous slurry of slaked lime and an aqueous solution of calcium chloride, the amount of lime and calcium chloride being sufficient to react with substantially all of the magnesium, boron and sulfate present in the brine to form magnesium hydroxide, a calcium borate hydrate, and calcium sulfate dihydrate, respectively, separating precipitated calcium sulfate dihydrate from said brine, adding hydrochloric acid to said brine to adjust the pH thereof to from about 8 to about 8.4, and further concentrating said brine to precipitate magnesium hydroxide and calcium borate hydrate.

5. The process according to claim 4 in which said brine, prior to said treatment, contains at least about 3 percent by weight, of lithium chloride and not more than about 2 ppm of magnesium.

6. The process according to claim 4 in which said calcium chloride is added as an aqueous solution containing from about 5 to about 20 percent, by weight, of calcium chloride, and the pH of said brine is adjusted to about 8.2.

* * * * *